United States Patent
Baldwin et al.

(10) Patent No.: US 6,243,661 B1
(45) Date of Patent: Jun. 5, 2001

(54) COATING THICKNESS GAUGE

(75) Inventors: Peter I Baldwin, Wilmslow; Brian L Williams, Poynton, both of (GB)

(73) Assignee: Elcometer Instruments Ltd., Manchester (GB)

( * ) Notice: Subject to any disclaimer, the term of this patent is extended or adjusted under 35 U.S.C. 154(b) by 0 days.

(21) Appl. No.: 09/022,604

(22) Filed: Feb. 12, 1998

(51) Int. Cl.[7] ........................................ G01B 5/02
(52) U.S. Cl. ............................ 702/170; 702/87; 702/97
(58) Field of Search ........................ 702/170, 87, 97, 702/104; 324/229, 230, 234; 73/1, 81

(56) References Cited

U.S. PATENT DOCUMENTS

| Re. 35,703 | * | 12/1997 | Koch et al. | 324/230 |
|---|---|---|---|---|
| 5,241,280 | * | 8/1993 | Aidun et al. | 324/671 |
| 5,293,132 | * | 3/1994 | Koch | 324/671 |
| 5,315,533 | * | 5/1994 | Stich et al. | 364/480 |
| 5,327,659 | * | 7/1994 | Banike | 33/834 |
| 5,343,146 | * | 8/1994 | Koch et al. | 324/230 |
| 5,416,411 | * | 5/1995 | Elsmore | 324/230 |
| 5,467,014 | * | 11/1995 | Nix | 324/230 |
| 5,539,322 | * | 7/1996 | Zoughi et al. | 324/644 |
| 5,557,970 | * | 9/1996 | Abbate et al. | 73/597 |
| 5,623,427 | * | 4/1997 | Vandervalk et al. | 364/563 |
| 5,723,791 | * | 3/1998 | Koch et al. | 73/597 |
| 5,751,608 | * | 5/1998 | Koch et al. | 364/563 |
| 5,847,562 | * | 12/1998 | Fulton et al. | 324/229 |
| 5,886,522 | * | 3/1999 | May | 324/230 |
| 5,930,744 | * | 7/1999 | Koch et al. | 702/170 |

* cited by examiner

*Primary Examiner*—Patrick Assouad
(74) *Attorney, Agent, or Firm*—Salter & Michaelson

(57) ABSTRACT

A coating thickness gauge is provided with a facility to store one or more zero offset values and to automatically subtract a chosen zero offset value from a measured coating thickness value. The gauge may be used to conveniently determine the thickness of coatings applied to rough surfaces using the zero offset calibration method where the gauge is provided with a key or keys. In order to prevent accidental adjustment of the calibration or any other important operational parameter of the gauge said key or keys must be depressed and held for a predetermined period of time.

17 Claims, 4 Drawing Sheets

COATING THICKNESS GAUGE

The present invention relates to coating thickness gauges.

DESCRIPTION OF THE PRIOR ART

A wide variety of coating thickness gauges are available for the measurement of coating thicknesses on substrates. Such coating thickness gauges include a probe which, in use, is placed onto a coated substrate. The probe, in conjunction with the gauge is arranged to produce an electrical signal which is indicative of the distance between the probe tip and the substrate, and hence the coating thickness. The electrical signal is interpreted by the gauge which produces a numerical thickness value. A variety of different probe types are employed, depending on the type of coating and associated substrate being measured, for example ferrous or non-ferrous metals. Measured coating thickness values may be stored in a memory for later analysis.

In order to provide meaningful results, coating thickness gauges must be calibrated and, ideally, recalibrated during their use. Where the coating being measured is applied to a smooth substrate the so-called two point calibration method is generally employed. The probe is placed directly onto an uncoated portion of the substrate and a reading taken from the gauge. The gauge can then be adjusted to give a zero thickness reading for this value. When a zero value has been established a foil of known thickness, to represent a coating, is placed onto the uncoated surface and the probe placed on the foil and a reading taken from the gauge. The gauge is then adjusted so that the thickness measured through the foil corresponds to the thickness of the foil. By providing two known values this enables the gauge to be calibrated over a range of values usually between zero and the foil thickness measured. It is desirable to take a number of readings at each reference point and to calculate mean values.

The two point method is simple and reliable where the coated substrate is smooth. Difficulties arise where the substrate is rough, often the case with shot blasted materials. Rough surfaces are widely used as they provide a good key on which to apply a coating. On a microscopic scale rough surfaces include a series of peaks and troughs. The height of the peaks typically varies between 10 and 80 microns. The existence of peaks and troughs makes the measurement of coating thickness difficult especially where coating thicknesses are measured over the peaks on rough surfaces. This leads to difficulty in the calibrating of coating thickness gauges.

A number of different techniques are available for the calibration of coating thickness gauges when used on rough substrates. One method involves the measurement of the thickness of two foils of different but known thickness, similar to the two-point method used for calibration when measuring a coating thickness as applied to a smooth substrate. Another method of calibration for rough surfaces is the zero offset method. When using this method a thickness gauge is first calibrated using a smooth substrate. Readings are then taken of coating thickness applied to a rough substrate and a constant or "zero offset" value subtracted from the measured result. The zero offset value is indicative of the degree of roughness of the surface. The zero offset value is usually of the order of half the mean peak height of the rough surface. The roughness of a particular surface is usually a known quantity often being a result of grit or shot blasting the surface.

Once a gauge has been calibrated, regardless of the method of calibration used, it is desirable that the calibrated state is maintained until such time as re-calibration becomes necessary. If calibration is lost, for instance as a result of accidental reprogramming of a gauge then time is wasted in re-calibrating the gauge.

SUMMARY OF THE INVENTION

It is an object of the present invention to provide a coating thickness gauge to enable the convenient use of the zero offset method when measuring coating thickness on rough substrates. It is a further object to provide a coating thickness gauge which reduces the risk of accidental reprogramming or loss of calibration.

According to a first aspect of the present invention there is provided a coating thickness gauge comprising a means for measuring coating thickness to determine a coating thickness value, a means for storing one or more constants and a means to subtract one of said constants from the coating thickness value to produce a modified coating thickness value.

The means for storing one or more constants preferably comprises an electronic memory "M." The gauge preferably includes a means to enable a plurality of coating thickness values to be stored, said means may comprise an electronic memory M which may be the same electronic memory used to store the constants.

The constants are preferably zero offset values, these values may be predetermined although it is preferable that a means is provided to enable a user of the gauge to input any desired value. A plurality of zero offset values may be stored from which a user may select a particular zero offset value which it is desired to subtract from measured coating thickness values. The stored zero offset values may be referred to by descriptive terms, for example fine, medium and coarse. In one such embodiment suitable values are 10, 25 and 40 microns respectively.

The means to subtract a chosen constant, or zero offset value, is preferably a microprocessor "P." The microprocessor P may include a memory and may be programmable.

The means to enable a user any desired constant value may comprise a key or keys. In addition, the gauge may also be provided with a means to et the constant value from a computer. The gauge may also include a display 4 to display measured values. In addition, the gauge may include a printer and/or a means to enable coating thickness readings to be transmitted to a computer. The constant values may be pre-set in such a manner that the operator may not change them.

The present invention provides a particularly convenient way for coating thickness readings to be taken from rough surfaces using the zero offset method. A chosen zero offset value may be selected and is then stored by the gauge, preventing possible loss or imperfect recollection of the value. In use the gauge subtracts the chosen zero offset value from the measured coating thickness values to give an accurate indication of a coating thickness as applied to a rough surface. As the subtraction is performed by the gauge this gives an instant result saving time and the need for tedious calculations to be made, whilst ensuring accuracy.

Where a gauge is employed to take coating thickness readings from a number of different surfaces appropriate zero offset values may be stored in the memory and selected as appropriate. Where both coating thickness values and zero offset values are stored in the memory the gauge may enable the choice of zero offset value to be retrospectively changed.

According to a second aspect of the present invention there is provided a coating thickness gauge comprising a means for storing an operational parameter and at least one key operable by a user, to enable the alteration of said parameter wherein said parameter may only be altered when said key is operated and held in an operated state for a predetermined period of time.

The means for storing preferably comprises an electronic memory. The operational parameter may relate to any function of the gauge although the parameter is preferably a value relating to the calibration of the gauge. The parameter may also comprise one or more zero offset constants. Preferably the gauge comprises a means to store a plurality of operational parameters which may be altered by operating an appropriate key or sequence of key operations. Such operational parameters are important for the accurate operation of the gauge, it is therefore preferable that these values may only be altered when the appropriate key has been operated and held for a predetermined period of time. The period of time is preferably at least 1 second, more preferably approximately 5 seconds. The key or keys are preferably operated by depressing and are resiliently mounted so as to release when pressure is removed.

More preferably, the operational parameter may only be altered following the simultaneous operation of more than one key and the holding of the keys in the operated state for a predetermined time.

In one embodiment, to alter an operational parameter two keys must be simultaneously depressed and held in the depressed position for 5 seconds. The instrument will then allow alteration of the parameter, for instance by use of one or the other of the two keys to index the parameter up or down. When the parameter has been adjusted to the desired value the instrument is arranged to store the revised value automatically when no further inputs have been made for a further predetermined period of time, preferably 3 seconds.

By requiring a key or keys to be held for a predetermined period of time before important calibration data or other parameters may be altered the risk of accidental alteration of the values is substantially reduced. Any chosen function of the gauge may be protected from accidental adjustment in this way by ensuring that operational parameters cannot be altered without the appropriate key being depressed and held.

This aspect of the invention therefore increases the ease and accuracy with which a coating thickness gauge may be used.

In order that the invention may be more clearly understood there are now described embodiments thereof by way of example and with reference to the accompanying drawings in which.

Figure 1:
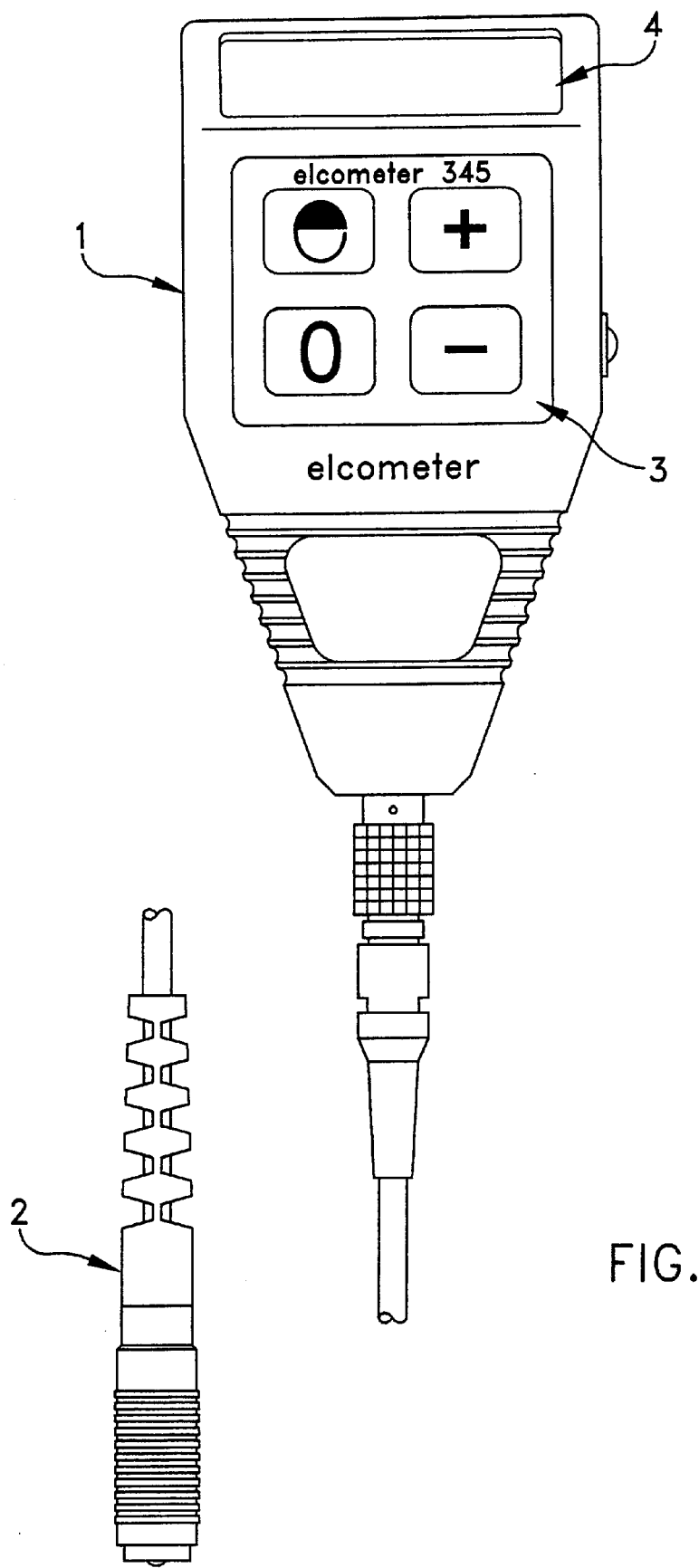
FIG. 1 shows a plan view of a coating thickness gauge.

Referring to FIG. 1 the gauge 1 includes a separate probe 2 which is connected to the gauge by a suitable cable (not shown). The probe could however be integral with the gauge. The gauge includes a key pad 3 and a visual display 4.

The key pad includes four keys although a different arrangement, for instance a two key or a key pad with any number of keys could be used.

The gauge 1 includes a memory which enables both a number of coating thickness values and a constant to be stored. The gauge includes a microprocessor "P" which is arranged to subtract the constant from the measured values, the resulting modified values also being stored in the memory and, optionally, displayed on the display 4. This provides a convenient manner in which to use the zero offset method of determining the thickness of coatings applied to rough surfaces.

The gauge may be calibrated using the standard two point method taking measurements from a smooth surface then, before taking measurements from a rough surface a suitable zero offset value may be entered into the memory by the use of the key pad 3. Then, upon taking measurements of coating thickness applied on the rough surface the gauge will modify the measured values accordingly by subtracting the selected zero offset value. The resulting modified value may be displayed on the display 4. This overcomes the need for tedious manual calculation and associated risk of error. As the zero offset value may be programmed by the user, the gauge may be used for measuring coating thickness on a variety of different surfaces.

Figure 2:
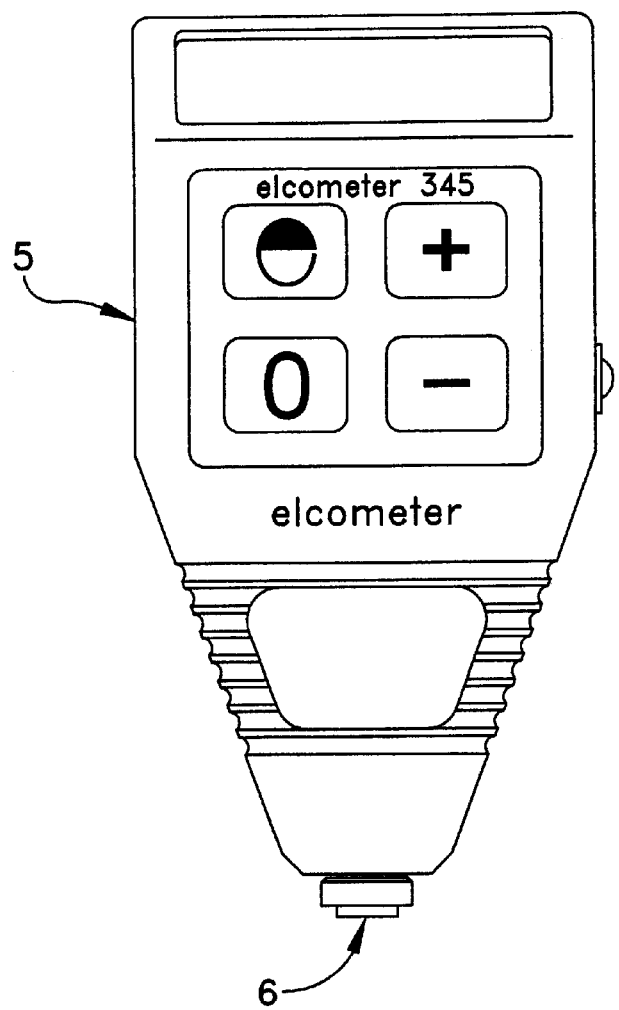
FIG. 2 shows a plan view of a second embodiment of a coating thickness gauge.

Referring to FIG. 2 there is shown an alternative gauge 5. The gauge 5 is similar to the gauge 1 illustrated in FIG. 1 save it includes an integral probe 6.

Figure 3:
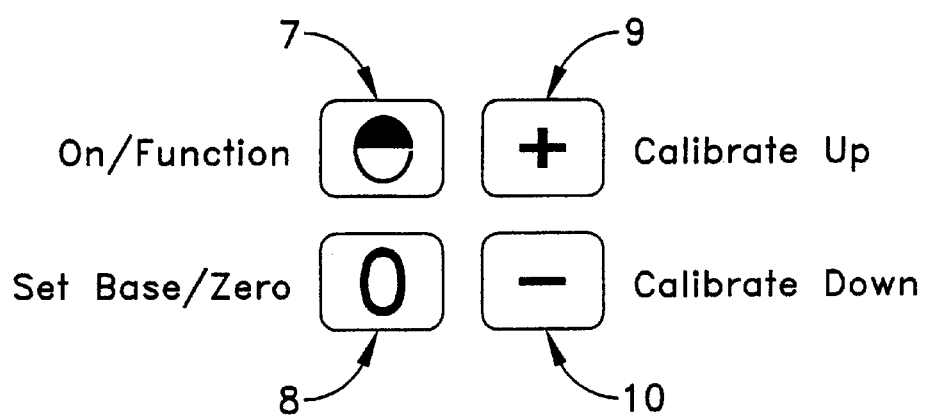
FIG. 3 shows a key pad of the type employed by the embodiments illustrated in FIGS. 1 and 2.

FIG. 3 shows an example key pad 3, 13 as employed by the gauges illustrated in FIGS. 1 and 2. The key pad includes four keys 7,8,9 and 10. Key 7 enables the gauge to be switched on and for an appropriate function to be selected. Key 8 enables the gauge to be set at zero, to assist with calibration. Keys 9 and 10 allow the calibration of the gauge to be adjusted incrementally up or down. For instance, when a foil of known thickness is placed between the tip of the measuring probe and an uncoated surface keys 9 and 10 may be used to adjust the calibration of the gauge so that the thickness measured by the gauge is the same as the known foil thickness. In order for the calibration of the gauge to be adjusted keys 9 and 10 must first be depressed and held in this state for a predetermined period of time, around 5 seconds. If keys 9 and 10 are depressed for less than this time then they have no effect. This reduces the risk of the gauge's calibration being altered accidentally, for example, through user error or one of the keys being depressed through contact with another object.

When keys 9 and 10 are depressed and held for 5 seconds then the gauge enters a routine whereby the calibration may be altered. This may be indicated by the gauge's display and/or an audible signal. Once the calibration routine has been entered the calibration of the gauge may be adjusted up or down by using keys 9 and 10 individually. If no key is depressed for at least 3 seconds then the gauge will automatically store the present calibration value and return to normal operation. The calibration may only be further adjusted by depressing and holding keys 9 and 10 to re-enter the calibration routine.

A similar delay in operation may be applied to keys 7 and 8 either for all purposes or only when they are used to enter particular programming routines to prevent accidental change of important operational parameters.

Figure 4:
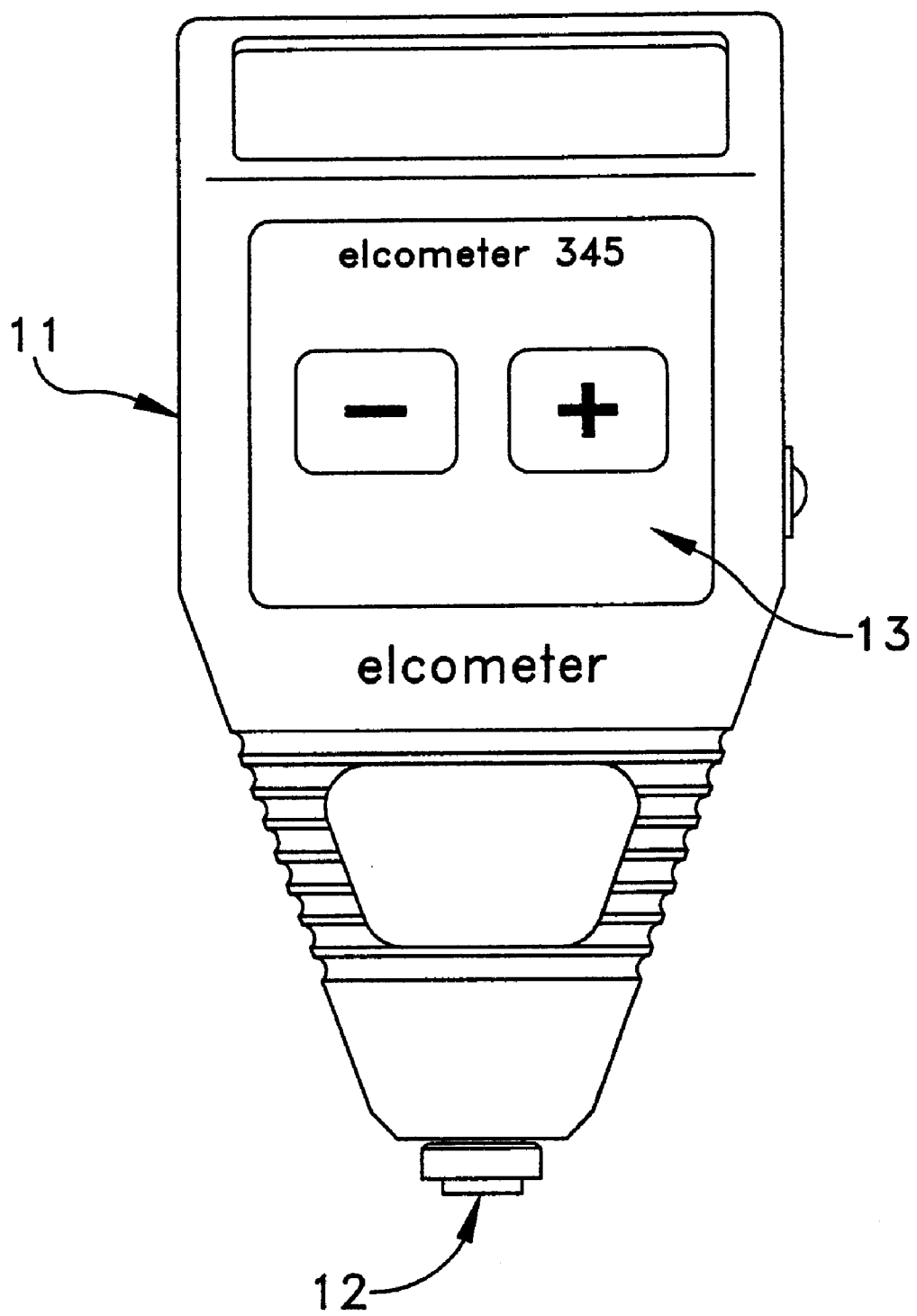
FIG. 4 shows a still further embodiment of a thickness gauge.
Figure 5:
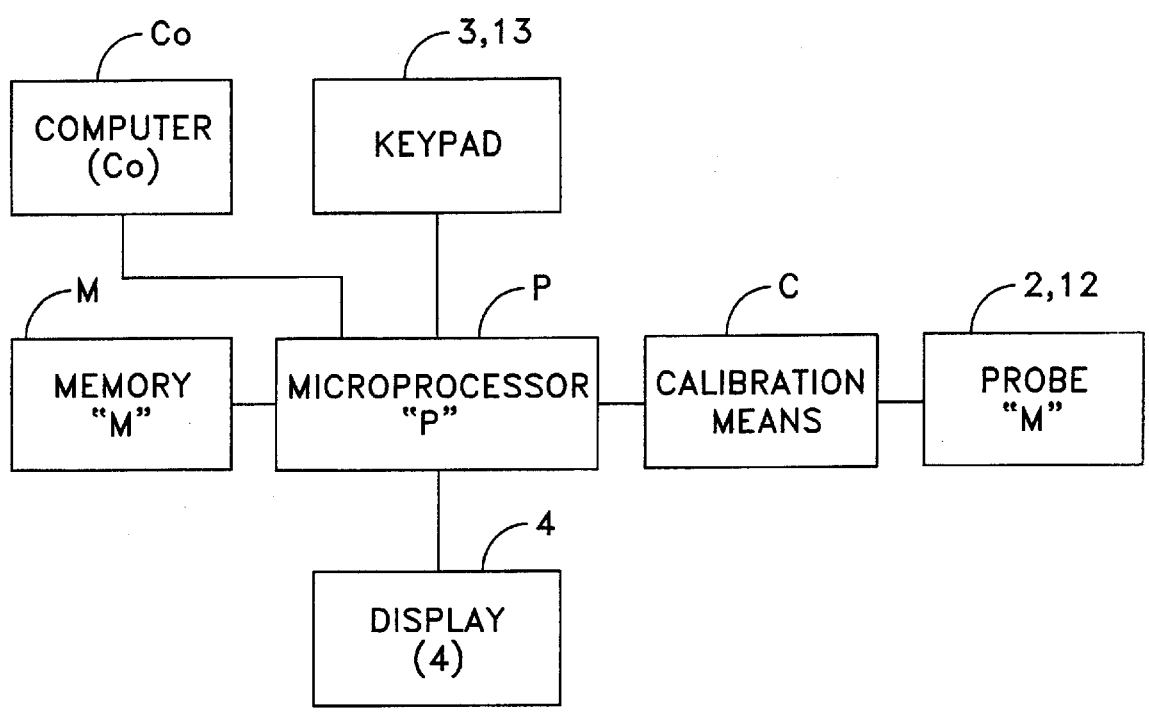
FIG. 5 shows a schematic block diagram of the gauges of FIGS. 1–4.

Referring to FIG. 4 there is shown a further embodiment of a gauge 11, with integral probe 12. The gauge 11 includes a two key, key pad 13. The key pad may be used to set the calibration of the gauge and when used in this way both keys must be depressed and held for at least 5 seconds, as described above. The gauge also includes provision for the storage of zero offset values and for their subtraction from measured coating thickness values.

Gauges according to the invention allow rapid and accurate measurement of coating thickness values of coatings applied to rough surfaces. Automatic subtraction reduces the risk of human error as does the requirement for the calibration keys to be depressed and held before adjustment can be effected.

The provision of a facility for storing and subtracting a chosen zero offset value from a measured coating thickness value is also of advantage when the gauge is used for other associated applications. One example is the measurement of coatings applied to silk screens used for printing. In printing, a coating is applied to a silk screen and it is desirable to measure the thickness of the coating to ensure optimum printing results. To do so, it is usual to place the silk screen onto a metal substrate and then use a coating thickness gauge to determine the distance between the surface of the coated silk screen and the substrate. Using existing equipment the measured result will give an indication of the sum of the thickness of the silk screen and the coating. In order to obtain a value of the coating thickness it is therefore necessary to subtract the thickness of the silk screen, a known value. The present invention enables the thickness of the silk screen to be programmed into the memory and automatically subtracted from the measured value enabling rapid and accurate measurement of the coating thickness.

The above embodiments are described by way of example only and many variations are possible without departing from the invention.

What is claimed is:

1. A coating thickness gauge comprising
   a means for measuring coating thickness to determine a coating thickness value,
   said means for measuring including a calibration means which enables the gauge to be calibrated, and further comprising
      a means for storing one or more constants and
      a means to subtract one of said constants from the coating thickness value to produce a modified coating thickness value.

2. A coating thickness gauge according to claim 1, wherein a means is provided to enable a user to input said constant value or values.

3. A coating thickness gauge according to claim 2, wherein said means to enable a user to input said constant value or values comprises a computer.

4. A coating thickness gauge according to claim 1, further comprising a means for storing a plurality of coating thickness values.

5. A coating thickness gauge according to claim 4, further comprising a means for storing a plurality of modified coating thickness values.

6. A coating thickness gauge according to claim 5, wherein said means for subtracting said constants comprises a microprocessor.

7. A coating thickness gauge according to claim 1, further comprising a means for storing an operational parameter and at least one key, operable by a user, to enable alteration of said parameter wherein said parameter may only be altered when said key is operated and held in an operated state for a predetermined period of time.

8. A coating thickness gauge according to claim 7, further comprising at least two keys, and wherein said parameter may only be altered when both keys are simultaneously operated and held in an operated state for a predetermined period of time.

9. A coating thickness gauge according to claim 2, wherein said means to enable a user to input said constant value or values comprises at least one key and where said constant values may only be in input when said key is operated and held in an operated state for a predetermined period of time.

10. A coating thickness gauge comprising a means for storing an operational parameter and at least one key, operable by a user, to enable the alteration of said parameter wherein said parameter may only be altered when said key is operated and held in an operated state for a predetermined period of time.

11. A coating thickness gauge according to claim 10, further comprising at least two keys and wherein said parameter may only be altered when both keys are simultaneously operated and held in an operated state for a predetermined period of time.

12. A coating thickness gauge according to claim 10, wherein said operational parameter relates to the calibration of the gauge.

13. A coating thickness gauge according to claim 1, wherein the subtracting means is a means to automatically subtract.

14. A method of measuring the thickness of a coating on a substrate comprising:
   providing a coating thickness gauge comprising a means for measuring coating thickness to determine a coating thickness value, said means for measuring including a calibration means which enables the gauge to be calibrate, and further comprising a means for storing one or more constants and a means to subtract one of said constants from the measured coating thickness value to produce a modified coating thickness value;
   measuring the thickness of the coating on the substrate, using the gauge, to obtain a coating thickness value; and
   subtracting the constant from the measured value using the gauge to obtain a modified coating thickness value.

15. A method of measuring the thickness of a coating on a rough substrate comprising:
   providing, a coating thickness gauge comprising a means for measuring the thickness of a coating on a substrate to determine a coating thickness value, said means for measuring including a calibration means which enables the gauge to be calibrated, and further comprising a means for storing one or more constants and a means to substrate one of said constants from the measured coating thickness value to produce a modified coating thickness value;
   calibrating the gauge to measure the thickness of a coating on a smooth substrate;
   measuring the thickness of the coating on the rough substrate, using the gauge, to obtain a coating thickness value; and
   subtracting the constant from the measured value using the gauge to obtain a modified coating thickness value indicative of the thickness of the coating on the rough substrate.

16. The method of claim 15, further comprising the step of providing a constant value relating to the roughness of the substrate and storing this in the means for storing, prior to measuring the coating thickness on the rough substrate.

17. The method of claim 15, further comprising the step of selecting a constant value relating to the roughness of the substrate from one or more values stored in the means for storing, prior to measuring the coating thickness on the rough substrate.

* * * * *